United States Patent
Bayesteh et al.

(10) Patent No.: US 9,948,430 B2
(45) Date of Patent: Apr. 17, 2018

(54) METHOD AND APPARATUS FOR COMBINING DATA AND RETRANSMISSION DATA IN LAYER DOMAIN

(71) Applicant: Huawei Technologies Co., Ltd., Shenzhen (CN)

(72) Inventors: Alireza Bayesteh, Ottawa (CA); Hosein Nikopour, San Jose, CA (US); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 14/660,462

(22) Filed: Mar. 17, 2015

(65) Prior Publication Data

US 2016/0277156 A1   Sep. 22, 2016

(51) Int. Cl.
*H04L 1/18* (2006.01)
*H04L 5/00* (2006.01)

(52) U.S. Cl.
CPC .......... *H04L 1/1819* (2013.01); *H04L 1/1887* (2013.01); *H04L 5/0055* (2013.01)

(58) Field of Classification Search
CPC ....... H04L 1/1628; H04L 1/1692; H04L 1/18; H04L 1/1812; H04L 1/1816;
(Continued)

(56) References Cited

U.S. PATENT DOCUMENTS 6,977,888 B1 * 12/2005 Frenger ................ H04L 1/1819
370/218

7,564,827 B2 * 7/2009 Das ........................ H04B 7/264
370/342

(Continued)

FOREIGN PATENT DOCUMENTS

| CN | 101409610 A | 4/2009 |
|---|---|---|
| CN | 101621364 A | 1/2010 |
| CN | 102377549 A | 3/2012 |

OTHER PUBLICATIONS

Liang et al., Piggyback Retransmissions over Wireless MIMO Channels: Shared Hybrid-ARQ (SHARQ) for Bandwidth Efficiency, Aug. 2013, IEEE Transactions on Wireless Communications, vol. 12, No. 8, pp. 3770-3781.*

(Continued)

*Primary Examiner* — Eric Nowlin
(74) *Attorney, Agent, or Firm* — Slater Matsil LLP

(57) ABSTRACT

There is provided methods and apparatus to improve spectral efficiency in Hybrid Automated Repeat reQuest (HARQ) communications. New data and retransmission data is combined in packets using code domain multiplexing, where data layers carry data and retransmission layers carry retransmission data. This technique is leveraged to introduce Multi-Packet HARQ. The HARQ layers contain Incremental Redundancy (IR) bits to assist in the decoding of a subset of previously undecoded layers. Multiple packets are jointly decoded at the receiver. Using the properties of code multiplexing, and in particular Sparse Code Multiple Access (SCMA), the correct decoding of a subset of previously undecoded layers assists in the decoding of all previously undecoded layers. HARQ feedback for multiple packets is jointly interpreted by the receiver and the transmitter using state tables. These techniques are further leveraged to allow for Multiple-User SCMA.

27 Claims, 9 Drawing Sheets

US 9,948,430 B2
Page 2

(58) Field of Classification Search
CPC ... H04L 1/1819; H04L 1/1822; H04L 1/1825;
H04L 1/1858; H04L 1/1861; H04L
1/1864; H04L 1/189; H04L 1/1896; H04L
5/0053; H04L 5/0055; H04L 1/1803;
H04L 1/1809; H04L 1/1845
See application file for complete search history.

(56) References Cited

U.S. PATENT DOCUMENTS

| Patent/Pub No. | Date | Inventor | Class |
|---|---|---|---|
| 8,125,884 B1* | 2/2012 | Li | H04B 7/046 370/203 |
| 8,230,290 B2* | 7/2012 | Seok | H04B 7/0417 700/103 |
| 8,477,666 B2* | 7/2013 | Astely | H04L 1/1621 370/252 |
| 8,527,829 B2* | 9/2013 | Fong | H04L 1/1812 370/330 |
| 8,743,998 B2* | 6/2014 | Kwon | H04B 7/0639 370/203 |
| 8,855,624 B2* | 10/2014 | Gerstenberger | H04W 72/0406 370/469 |
| 8,953,522 B2* | 2/2015 | Han | H04B 7/0426 370/310.2 |
| 8,959,410 B2* | 2/2015 | Fong | H04L 1/1812 714/749 |
| 8,982,796 B2* | 3/2015 | Ko | H04B 7/0404 370/216 |
| 9,197,377 B2* | 11/2015 | Fong | H04L 1/1812 |
| 9,374,198 B2* | 6/2016 | Fong | H04L 1/1812 |
| 9,479,994 B2* | 10/2016 | Zhou | H04L 1/1893 |
| 9,497,056 B2* | 11/2016 | Limberg | H04L 27/2003 |
| 9,654,258 B2* | 5/2017 | Fong | H04L 1/1812 |
| 9,655,125 B2* | 5/2017 | Gerstenberger | H04W 72/0406 |
| 9,755,708 B2* | 9/2017 | Onggosanusi | H04B 7/0413 |
| 2003/0076783 A1* | 4/2003 | Das | H04B 7/264 370/236 |
| 2005/0138528 A1* | 6/2005 | Ameigeiras | H04L 1/1874 714/774 |
| 2005/0226239 A1* | 10/2005 | Nishida | H04L 1/1874 370/389 |
| 2005/0281212 A1* | 12/2005 | Jeong | H04L 1/1671 370/310 |
| 2006/0013257 A1* | 1/2006 | Vayanos | H04L 1/1854 370/473 |
| 2006/0245384 A1* | 11/2006 | Talukdar | H04L 1/0041 370/310 |
| 2007/0121569 A1* | 5/2007 | Fukui | H04L 1/16 370/347 |
| 2007/0189205 A1* | 8/2007 | Terry | H04L 1/1812 370/328 |
| 2007/0197252 A1 | 8/2007 | Watanabe et al. | |
| 2008/0069074 A1* | 3/2008 | Shin | H04B 7/0417 370/342 |
| 2008/0198946 A1* | 8/2008 | Lee | H04B 7/0417 375/299 |
| 2008/0225791 A1* | 9/2008 | Pi | H04B 7/0417 370/330 |
| 2009/0089638 A1 | 4/2009 | Heise et al. | |
| 2009/0122758 A1* | 5/2009 | Smith | H04L 1/08 370/330 |
| 2009/0249158 A1* | 10/2009 | Noh | H04L 1/0026 714/750 |
| 2009/0262856 A1* | 10/2009 | Onggosanusi | H04B 7/0413 375/267 |
| 2009/0304109 A1* | 12/2009 | Kotecha | H04L 1/06 375/299 |
| 2009/0313516 A1* | 12/2009 | Shin | H04L 1/0003 714/748 |
| 2009/0327831 A1 | 12/2009 | Xue et al. | |
| 2010/0165830 A1* | 7/2010 | Amir | H04L 45/04 370/216 |
| 2010/0260120 A1* | 10/2010 | Shen | H04L 1/1858 370/329 |
| 2010/0265897 A1* | 10/2010 | Kwon | H04L 1/0007 370/329 |
| 2011/0041027 A1* | 2/2011 | Fong | H04L 1/1812 714/749 |
| 2011/0044278 A1* | 2/2011 | Astely | H04L 1/1621 370/329 |
| 2011/0103493 A1* | 5/2011 | Xia | H04B 7/0632 375/259 |
| 2011/0150129 A1* | 6/2011 | Kwon | H04B 7/0639 375/295 |
| 2012/0026963 A1* | 2/2012 | Kim | H04L 1/1812 370/329 |
| 2012/0082248 A1* | 4/2012 | Han | H04B 7/0413 375/259 |
| 2013/0094468 A1* | 4/2013 | Ko | H04B 7/0404 370/329 |
| 2013/0095816 A1* | 4/2013 | Gerstenberger | H04W 72/0406 455/422.1 |
| 2013/0148584 A1 | 6/2013 | Zhu et al. | |
| 2013/0165183 A1* | 6/2013 | Gerstenberger | H04L 1/1835 455/561 |
| 2013/0294242 A1* | 11/2013 | Zhao | H04W 72/1252 370/235 |
| 2014/0050140 A1* | 2/2014 | Fong | H04L 1/1812 370/312 |
| 2014/0140360 A1* | 5/2014 | Nikopour | H04J 13/00 370/479 |
| 2014/0313878 A1* | 10/2014 | Zhou | H04L 1/1893 370/216 |
| 2014/0369308 A1* | 12/2014 | Gerstenberger | H04W 72/0406 370/329 |
| 2014/0369434 A1* | 12/2014 | Taherzadehboroujeni | H04B 7/0456 375/261 |
| 2015/0049723 A1* | 2/2015 | Fong | H04L 1/1812 370/329 |
| 2015/0124689 A1* | 5/2015 | Merlin | H04L 5/0055 370/312 |
| 2015/0349864 A1* | 12/2015 | Kim | H04J 11/00 375/299 |
| 2015/0358106 A1* | 12/2015 | Limberg | H04L 27/2003 375/308 |
| 2016/0043833 A1* | 2/2016 | Fong | H04L 1/1812 370/280 |
| 2016/0119947 A1* | 4/2016 | Park | H04B 7/024 370/329 |
| 2016/0143055 A1* | 5/2016 | Nammi | H04W 74/006 370/329 |
| 2016/0218996 A1* | 7/2016 | Gerstenberger | H04L 1/1835 |
| 2016/0277157 A1* | 9/2016 | Fong | H04L 1/1812 |
| 2017/0134140 A1* | 5/2017 | Park | H04B 7/0413 |

OTHER PUBLICATIONS

Glisic, Chapter 5: Multiuser Communication, Advanced Wireless Communications: 4G Cognitive and Cooperative Broadband Technology, Jun. 2007, John Wiley & Sons Ltd, 2nd Edition, pp. 191-267.*

Ghaderi, Uplink Scheduling in Wireless Networks with Successive Interference Cancellation, May 2, 2013, IEE Transactions on Mobile Computing, vol. 13, Issue 5, pp. 1132-1144.*

Nikopour et a., Sparse Multiple Code Access, Sep. 11, 2013, 2013 IEEE 24th International Symposium on Personal Indoor and Mobile Radio Communication (IMPRC), IEEE, Electronic ISBN: 978-1-4673-6235-1.*

* cited by examiner

METHOD AND APPARATUS FOR COMBINING DATA AND RETRANSMISSION DATA IN LAYER DOMAIN

FIELD OF THE DISCLOSURE

The present disclosure relates to mobile communications, and in particular relates to mobile communications in which code domain multiplexing is used to combine new data and retransmission data in different layers.

BACKGROUND

General code domain multiplexing includes multiplexing data in multiple code layers, in which each layer has its own codebook or signature.

HARQ is a retransmission technique in which data may be transmitted with a Forward Error Correction code. Upon reception of erroneous data, a receiver may request retransmission. There are two main techniques used for retransmission, namely Chase-Combining (CC) and Incremental Redundancy (IR).

In Chase-Combining, the originally transmitted data is repeatedly retransmitted along with parity bits. The retransmitted data and parity bits are combined with the originally transmitted data and parity bits using Log Likelihood Ratios (LLR) or symbol level combining. Signal combining is equivalent to power accumulation leading to a better quality of the equivalent channel and higher chance of successful decoding of the original data.

In Incremental Redundancy, new parity bits are transmitted with every retransmission until an acknowledgement (ACK) is received. The new parity bits along with previously transmitted parity bits reduce the equivalent code rate of the data transmission with better error protection capability. A stronger code may lead to the successful decoding of the original data.

Under either CC or IR, the HARQ process is stopped until the original data is successfully decoded and an acknowledgement (ACK) is sent from the receiver to the transmitter, or the HARQ process reaches its maximum number of allowable transmission attempts.

SUMMARY

One aspect of the present disclosure provides a method at a transmitter. The method includes receiving a Negative Acknowledgement (NACK) from a receiver, the NACK corresponding to a previously transmitted data packet and transmitting, to the receiver, a new packet. The new packet comprises data layers carrying new data, and retransmission layers carrying retransmission data related to the previously transmitted data packet. The data layers and retransmission layers are multiplexed in the code domain.

Another aspect of the present disclosure provides a method at a receiver. The method includes attempting to decode a data packet received from a transmitter and determining that the data packet was incorrectly decoded. The method further includes transmitting a Negative Acknowledgment (NACK) to the transmitter and receiving, from the transmitter, a new packet. The new packet comprises data layers carrying new data, and retransmission layers carrying retransmission data related to the data packet. The data layers and retransmission layers are multiplexed in the code domain.

Another aspect of the present disclosure provides a method at a transmitter for multi-packet Hybrid Automated Repeat reQuest operation. The method includes receiving HARQ feedback from a receiver. The HARQ feedback comprises at least one Negative Acknowledgment (NACK) corresponding to at least one incorrectly decoded data layer at the receiver. The method further includes transmitting to the receiver a packet including HARQ layers. The HARQ layers include Incremental Redundancy (IR) bits for a subset of the at least one incorrectly decoded layers.

Another aspect of the present disclosure provides a transmitter configured for multi-packet Hybrid Automated Repeat reQuest operation. The transmitter includes a Central Processing Unit (CPU) and a communication subsystem cooperating to receive HARQ feedback from a receiver. The HARQ feedback comprises at least one Negative Acknowledgment (NACK) corresponding to at least one incorrectly decoded data layer at the receiver. The CPU and the communication subsystem further cooperate to transmit to the receiver a packet including HARQ layers. The HARQ layers include Incremental Redundancy (IR) bits for a subset of the at least one incorrectly decoded layers.

Another aspect of the present disclosure provides a method at a receiver for multi-packet Hybrid Automated Repeat reQuest (HARQ) operation. The method includes transmitting HARQ feedback to a transmitter comprising at least one Negative Acknowledgement (NACK) corresponding to at least one incorrectly decoded data layer at the receiver. The method further includes receiving a packet from the transmitter including HARQ layers. The HARQ layers include Incremental Redundancy (IR) bits for a subset of the at least one incorrectly decoded layers.

Another aspect of the present disclosure provides a receiver configured for multi-packet Hybrid Automated Repeat reQuest (HARQ) operation. The receiver includes a Central Processing Unit (CPU) and a communication subsystem cooperating to transmit HARQ feedback to a transmitter. The HARQ feedback comprises at least one Negative Acknowledgement (NACK) corresponding to at least one incorrectly decoded data layer at the receiver. The CPU and the communication subsystem further cooperate to receive a packet from the transmitter including HARQ layers. The HARQ layers include Incremental Redundancy (IR) bits for a subset of the at least one incorrectly decoded data layers.

Another aspect of the present disclosure provides a method at a receiver for decoding incoming packets. The method includes receiving a first packet including first data layers from a transmitter and receiving a second packet including second data layers and Hybrid Automated Repeat reQuest (HARQ) layers multiplexed in the code domain. The Log Likelihood Ratio (LLR) for the first data layers and the HARQ layers are combined, and a probability of symbols for the first data layers, the second data layers, and the HARQ layers are determined. The method further includes attempting to decode the second data layers, and if the decoding is ambiguous, reattempting to decode the second data layers using the probability of symbols for the HARQ layers and the first data layers.

Another aspect of the present disclosure provides a method at a network element for supporting multi-packet Hybrid Automated Repeat reQuest (HARQ). The method includes determining state tables which designate, for a combination of HARQ feedbacks, a combination of data layers and HARQ layers to be transmitted. The method further includes broadcasting the state tables to nodes served by the network element.

Another aspect of the present disclosure provides a method at a network element. The method includes receiving HARQ feedback from a plurality of wireless devices, the HARQ feedback comprising at least one Negative Acknowledgment (NACK), the at least one NACK corresponding to at least one incorrectly decoded data layer at one of the plurality of wireless devices. The method further includes transmitting, to the plurality of wireless devices, a packet including HARQ layers, the HARQ layers including Incremental Redundancy (IR) bits for a subset of the at least one incorrectly decoded data layers.

Another aspect of the present disclosure provides a method at a wireless device. The method includes receiving a data packet, the data packet including data layers addressed to the wireless device and data layers addressed to other wireless devices and attempting to decode the data layers addressed to the wireless devices. The method further includes determining that the decoding of the data layers addressed to the wireless device failed and receiving a second packet including HARQ layers, the HARQ layers including Incremental Redundancy (IR) bits for data layers addressed to the other wireless devices. The method further includes using the HARQ layers to decode the data layers addressed to the other wireless devices and re-attempting to decode the data layers addressed to the wireless device.

In the above aspects, the HARQ layers may be multiplexed with the new data layers in the code domain and transmitted together.

BRIEF DESCRIPTION OF THE DRAWINGS

The present disclosure will be better understood with reference to the drawings in which.

DETAILED DESCRIPTION

Sparse Code Multiple Access (SCMA) is a code domain non-orthogonal multiple-access technique which can improve spectral efficiency of wireless radio access. With SCMA, different incoming data streams are directly mapped to codewords of different multi-dimensional codebooks, where each codeword represents a spread transmission layer. Multiple SCMA layers share the same time-frequency resources of Orthogonal Frequency-Division Multiple Access (OFDMA). The sparsity of codewords makes near-optimal detection feasible through an iterative message passing algorithm (MPA). Such low complexity of multi-layer detection allows excessive codeword overloading in which the dimension of multiplexed layers exceeds the dimension of codewords.

Figure 1:
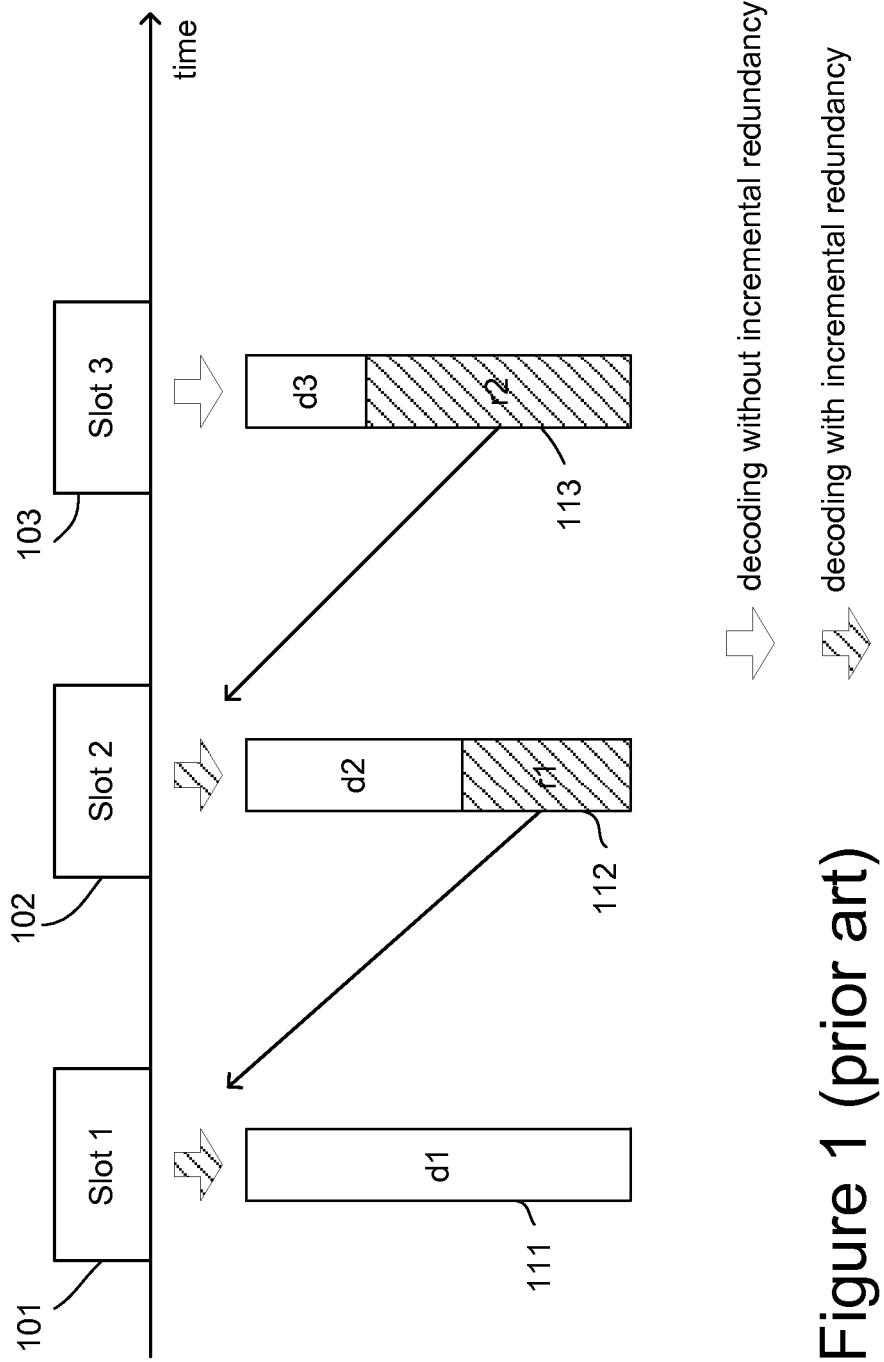
FIG. 1 is a timing diagram illustrating combination of new data and incremental redundancy bits according to the prior art.

Reference is made to FIG. 1, which shows the decoding of data packets using incremental redundancy. According to the technique illustrated in FIG. 1, data and IR bits are combined at the bit level.

At block 101, a first data packet 111 including data d1 is received in slot 1. In this scenario, data packet 111 is not decoded correctly, and a negative acknowledgement (NACK) is sent to the transmitter (not shown).

In response to the NACK, the transmitter includes redundancy bits in its next transmission. Specifically, at block 102, a second data packet 112 is received in slot 2. The data packet 112 includes both data d2 and redundancy bits r1. Redundancy bits are intended to help the receiver decode data packet 111 correctly after a first decoding failure. In the example of FIG. 1, data packet 112 is not received correctly, and the receiver sends another NACK to the transmitter.

In response to this NACK, the transmitter includes further redundancy bits in its next transmission.

At block 103, a third data packet 113 is received in slot 3. The data packet 113 includes both data d3 and redundancy bits r2. As can be seen from FIG. 1, in packet 113, redundancy bits make up a greater proportion of the total bits in packet 113 than the redundancy bits in packet 112. Likewise, data bits make up a smaller proportion of the total bits in packet 113 than the data bits in packet 112. This is because redundancy bits r2 include redundancy bits for decoding data packet 111 and data packet 112. As a result, the amount of data transmitted in data packet 113 is reduced.

In the example of FIG. 1, data packet 113 is decoded correctly, and an acknowledgement (ACK) is sent to the transmitter. The redundancy bits r2 are then used to correctly decode the previously received packet 112 to produce data d2 and redundancy bits r1. Redundancy bits r2 are further used to correctly decode the previously received packet 111 and produce data d1.

Based on the above, each successive packet that is incorrectly decoded or is unable to be decoded leads to less data transfer. Further, it produces excessive delay as the first packet cannot be decoded until the last packet is decoded correctly. The present disclosure provides methods and apparatus in which general code domain multiplexing is utilized to improve spectral efficiency of HARQ processes and to allow for multi-packet HARQ.

While the following embodiments are described below with reference to SCMA, the methods and apparatuses described herein may be adapted to other general code domain multiplexing techniques, and the present disclosure is not so limited.

According to at least some embodiments, some SCMA layers are defined to carry data bits, and other SCMA layers are defined to carry Incremental Redundancy (IR) bits to assist in decoding a previously received packet. The IR bits assist in the decoding of previously received packets which were unsuccessfully decoded. In the present disclosure, SCMA layers carrying data will be referred to as "data layers", and SCMA layers carrying IR bits will be referred to as "HARQ layers". HARQ layers contain IR bits to help decode one or more previously transmitted and incorrectly decoded data layers.

The combination of new data and retransmission data in the layer domain, as opposed to the bit domain, allows for improved spectral efficiency, reduced latency, and for other functionality as described below.

According to the present disclosure, Multi-Packet HARQ (MP-HARQ) is proposed by taking advantage of code domain multiplexing. In MP-HARQ, multiple packets or their corresponding retransmissions may be combined in the code domain. In particular, a first transmission of a packet is combined with HARQ retransmission data from another packet. Using code domain multiplexing, successful decoding of one packet helps to decode the other packet. Therefore, even if both packets, taken individually, are unsuccessfully decoded at first, HARQ retransmission data for only one packet may lead to both packets being successfully decoded, by using an iterative detection process described in greater detail below.

An ACK/NACK protocol and control signaling to support MP-HARQ is also proposed.

In some embodiments, MP-HARQ may be utilized in combination with Multi-User SCMA (MU-SCMA).

The combination of new data and retransmission data in the layer domain is illustrated with reference to FIG. 2.

Figure 2:
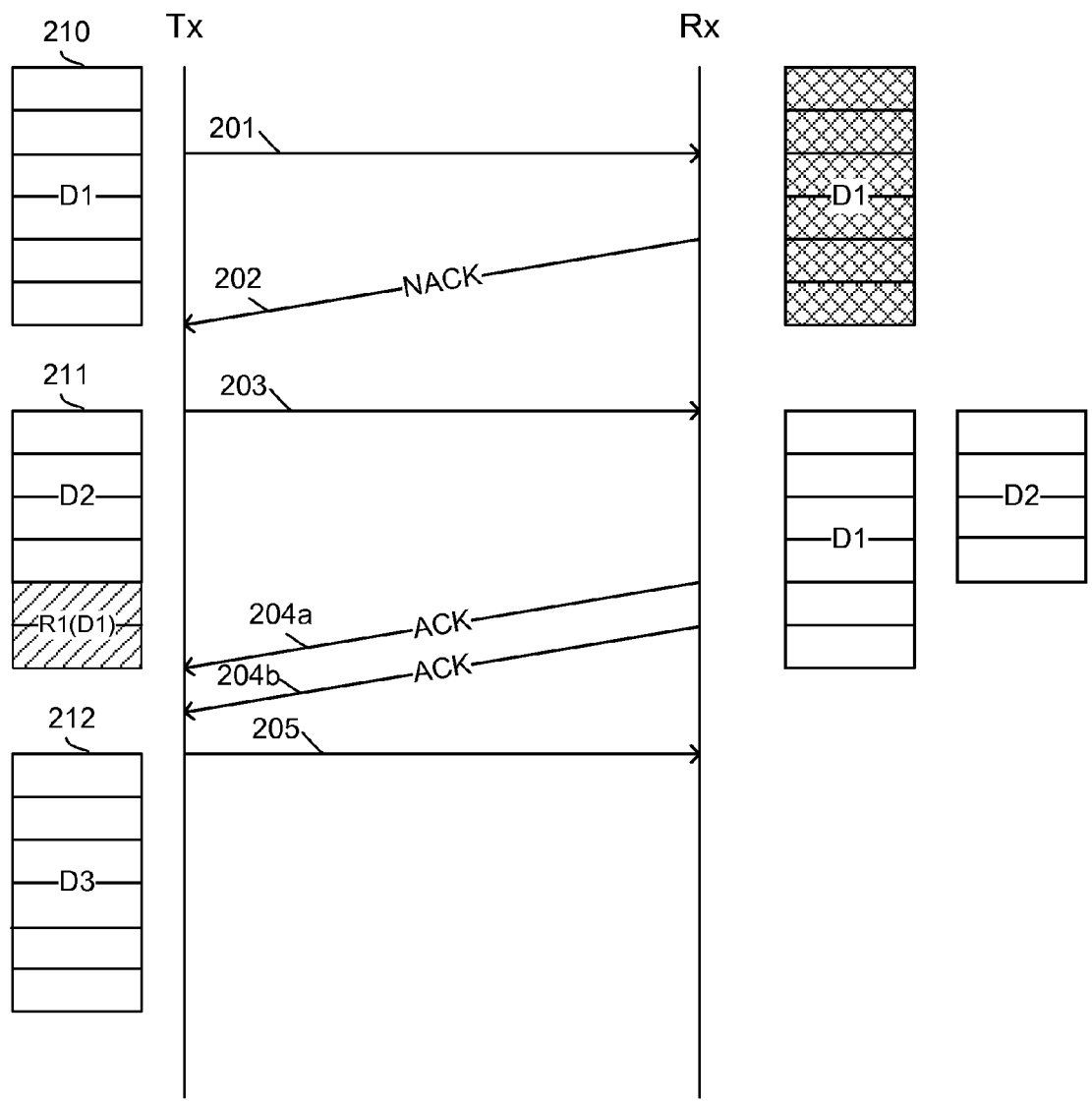
FIG. 2 is a block diagram illustrating a HARQ procedure according to at least one embodiment of the present disclosure.

In FIG. 2, packet 210 includes six SCMA layers, all of which are data layers. The data carried by the six SCMA layers is collectively referred to as D1. Notably, although the data packets in the present example include six SCMA layers, the present disclosure is not so limited and the use of different numbers of layers is contemplated.

As illustrated by arrow 201, packet 210 is transmitted from a transmitter to a receiver. The receiver does not decode packet 210 correctly, and the receiver responds with a negative acknowledgement (NACK), as illustrated by arrow 202.

Upon receiving the NACK of arrow 202, the transmitter prepares packet 211 for transmission. As in the case of packet 210, packet 211 includes six SCMA layers. However, unlike packet 210, packet 211 comprises four data layers, carrying data that is collectively referred to as D2, and two HARQ layers, carrying IR bits to help decode data D1. Therefore, in packet 211, new data layers D2 and HARQ layers R1 are combined. Thus, new data and retransmission data is combined in the layer domain, and not in the bit domain.

In the present disclosure, IR bits provided in the n-th HARQ attempt to help decode incorrectly decoded data Dx will be referred to as Rn(Dx). Therefore, in the present example, packet 211 includes IR bits R1(D1).

In the example of FIG. 2, packet 211 is correctly received at the receiver. The receiver extracts data layers carrying D2 and in response, sends an acknowledgement (ACK) 204a to the transmitter. The receiver further extracts HARQ layers carrying R1(D1) and uses R1(D1) to correctly decode the previously received data D1. If the receiver is successful in decoding D1 with the assistance of R1(D1), the receiver sends an additional ACK 204b to the transmitter.

The correspondence between HARQ feedbacks 204a and 204b, and data D1 and D2 may be predetermined, or may be determined by control signaling.

In response to ACKs 204a and 204b, the transmitter prepares packet 212. Since no NACKs have been received, and the receiver has correctly decoded all previously transmitted packets, packet 212 does not include any HARQ layers but rather includes six new data layers. Packet 212 is then transmitted as illustrated by arrow 205.

The above example illustrates the concept of code-domain super-positioning for new data and HARQ. Thus, whereas prior solutions multiplex or combine data and IR bits in the bit domain, the present disclosure provides for the multiplexing or combining of data and IR bits in the code domain, thereby resulting in improved spectral efficiency and reduced latency.

Figure 3:
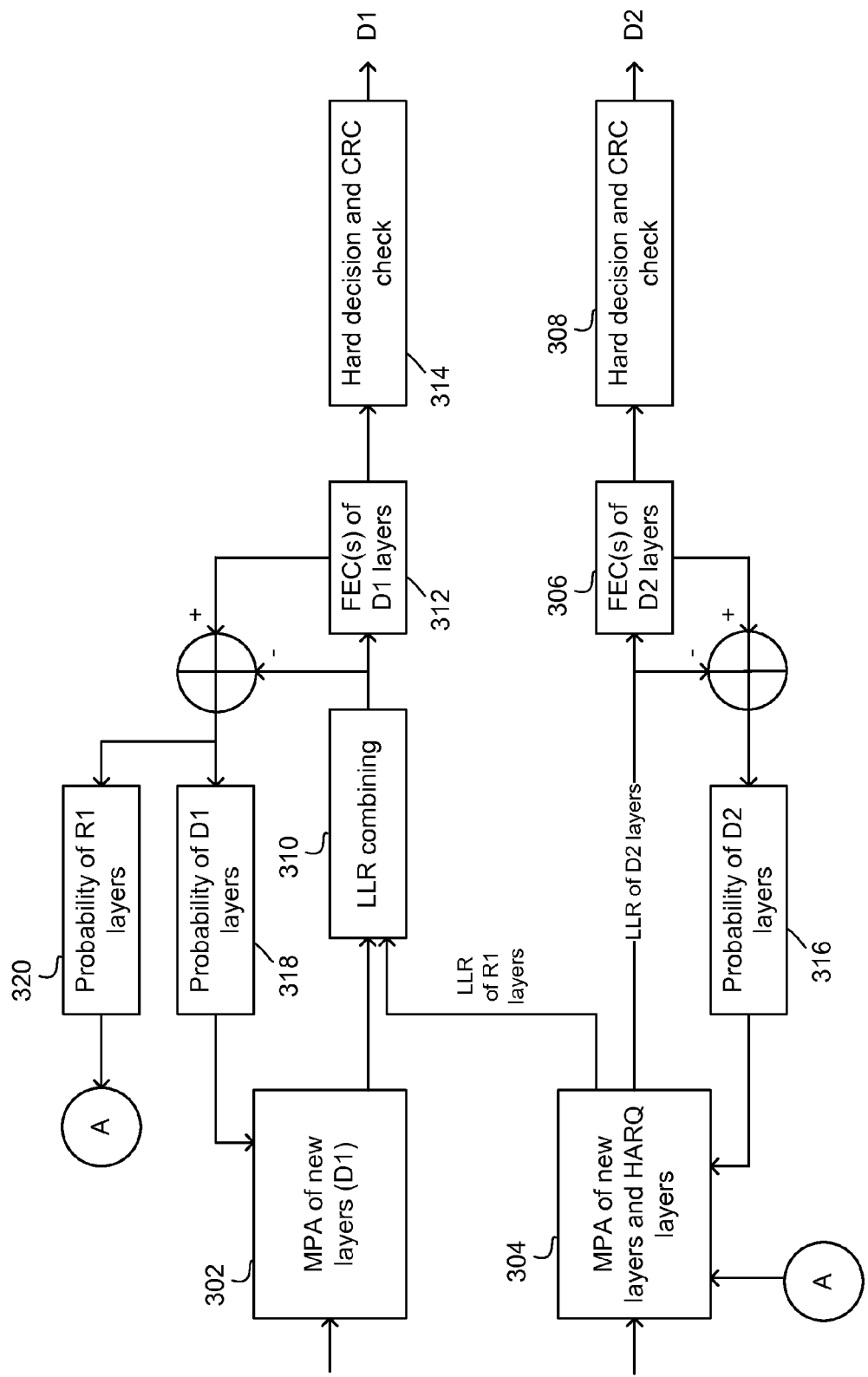
FIG. 3 is a block diagram illustrating the reception of data according to at least one embodiment of the present disclosure.

Reference is now made to FIG. 3, which shows a block diagram illustrating the reception of data layers and HARQ layers according to one embodiment of the present disclosure. A Message Passing Algorithm (MPA) may be used for reception of data layers carrying data D1, as shown at block 302.

The output of MPA blocks may then be represented as a Log Likelihood Ratio (LLR). In the example of FIG. 3, the original reception of the data layers was unsuccessful.

At a later time slot, new data layers carrying data D2 and HARQ layers carrying R1(D1) are received as shown at block 304. The LLR of D2 layers are processed and the Forward Error Correction (FEC) code is checked at block 306. If possible, a hard decision is made and the Cyclic Redundancy Check (CRC) is performed at block 308.

If a hard decision cannot be made, the probability of different symbols for the D2 layers are computed at block 316 and the process returns to block 304. Further, as an input to block 304, the probability of different symbols for the R1 layers are provided, as discussed below. Notably, the knowledge of the probabilities of different symbols for both the D2 layers and the R1 layers improves the odds of successfully decoding D2.

The LLR of R1 layers are combined with the LLR of D1 at block 310. This facilitates the decoding of data D1. The combined LLRs are then processed and the FEC is checked at block 312. If possible, a hard decision is made and the CRC is performed at block 314.

If a hard decision with respect to D1 cannot be made, the probability of different symbols for D1 layers are computed at block 318 and the process returns to block 302. Also, the probability of different symbols for R1 layers are computed at block 320 and are combined with the probability of symbols for D2 layers at block 304 as discussed above.

As seen from the above, the HARQ layers are jointly detected with new data layers, and the LLR combining of HARQ layers with original data layers facilitates the correct decoding of the original data.

In the above example, the correct decoding of D1 facilitates the decoding of D2, as decoding of D1 implies knowledge of R1, and knowledge of R1 may be used in the decoding of D2. Moreover, the correct decoding of D2 facilitates the decoding of D1, because knowledge of D2 may be used in the decoding of R1, and R1 facilitates the decoding of D1.

Notably the above example uses data layers D1 and D2, and HARQ layers R1, however, the same principles may be extended for any number of different data layers and HARQ layers, and the present disclosure is not limited to any particular number of data layers.

More generally, the above example illustrates a process of iterative decoding of multiple packets over multiple transmission attempts. According to one embodiment, N packets are received over N scheduling intervals. The first packet includes data layers, and the remaining (N−1) packets include data layers and HARQ layers. On the receiver side, the received signal over each interval is processed in a MPA block and information shared between the MPA blocks is used to facilitate the decoding of the packets. For example, output LLRs of different MPA blocks may be combined, and information such as symbol probabilities or other soft information, relating either to the data or IR bits from different MPA blocks may be combined to facilitate the decoding of all N packets.

Figure 4:
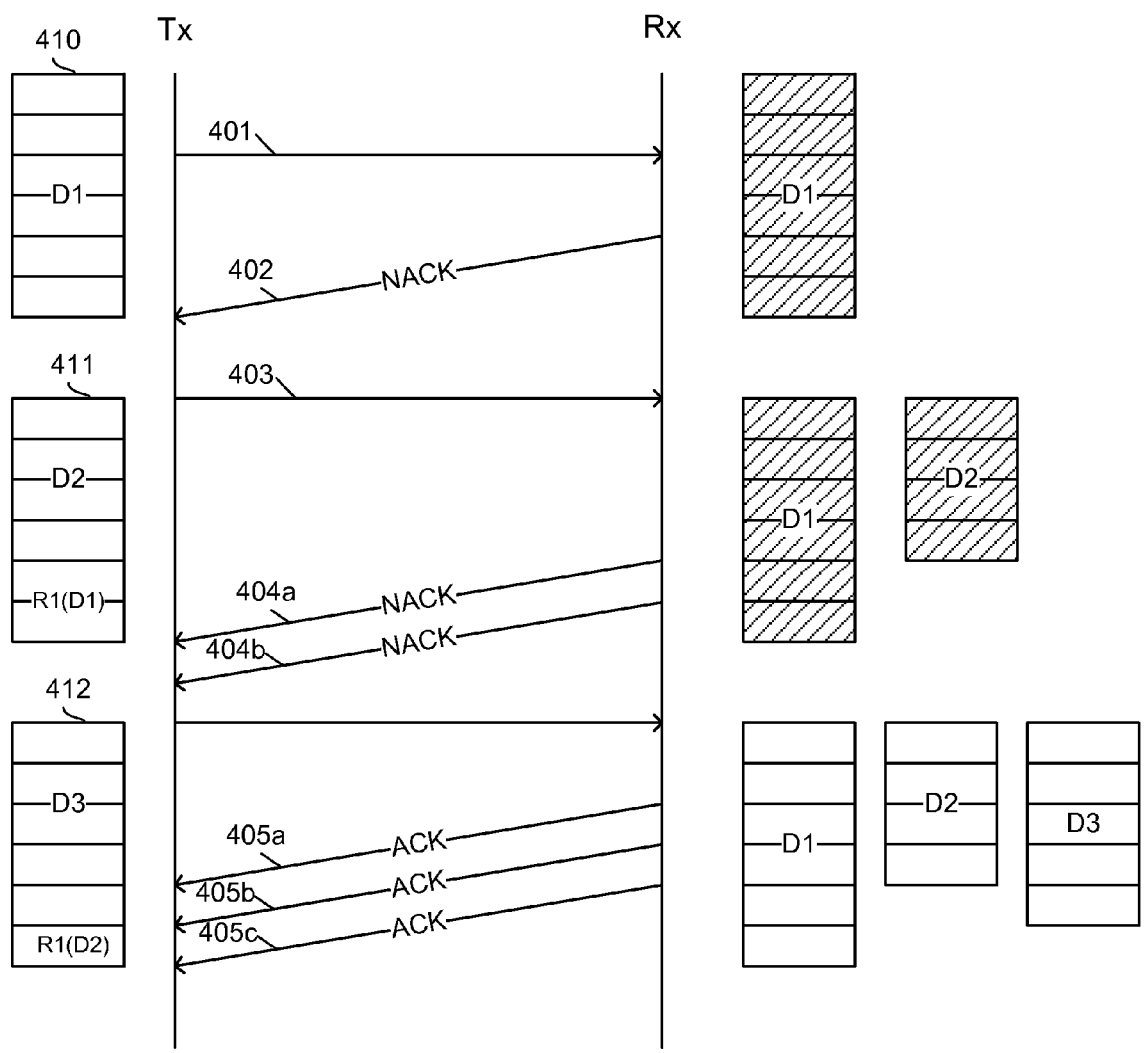
FIG. 4 is a block diagram illustrating a HARQ procedure according to at least one embodiment of the present disclosure.

Reference is now made to FIG. 4, illustrating an example of MP-HARQ over 3 scheduling intervals.

In the example of FIG. 4, packet 410 is transmitted from a transmitter to a receiver as illustrated by arrow 401. Packet 410 includes six data layers, collectively referred to as D1. In this example, packet 410 is not correctly decoded at the receiver, and a NACK 402 is returned to the transmitter.

In response to NACK 402, the transmitter prepares packet 411. Packet 411 includes six SCMA layers, four of which are data layers, collectively referred to as D2, and two of which are HARQ layers, referred to as R1 (D1) based on the nomenclature described above. Packet 411 is transmitted to the receiver as illustrated by arrow 403.

In the example of FIG. 4, packet 411 is not properly decoded by the receiver and the receiver responds by transmitting NACKs 404a and 404b. As discussed above, one NACK of NACKs 404a and 404b corresponds to the improper reception of data D2, and the other corresponds to not having properly decoded data D1.

Upon reception of NACKs 404a and 404b, the transmitter prepares packet 412 for transmission. As can be seen from FIG. 4, packet 412 includes six SCMA layers, five of which are data layers, and one of which is a HARQ layer. The five data layers carry data which is collectively referred to as D3, and the HARQ layer carries IR bits which are referred to as R1 (D2) based on the nomenclature described above.

Specifically, the IR bits carried in the HARQ layer of packet 412 are intended to facilitate the decoding of data D2, and they are the first set of IR bits provided for this purpose.

In the example of FIG. 4, packet 412 is correctly decoded by the receiver. The receiver extracts data layers carrying D3 and provides HARQ feedback 405a. In this case, D3 is correctly decoded and therefore HARQ feedback 405a is an ACK. The receiver also extracts R1 (D2) from the HARQ layer of packet 412, and uses R1 (D2) to correctly decode previously received D2. If D2 is correctly decoded, an ACK 405b is transmitted. If D2 is incorrectly decoded a NACK would be transmitted instead.

Layers in a Code Multiplex schemes, and SCMA layers in particular, have the property that their decoding is not completely dependent of other layers in the same packet. Therefore, some layers of a packet may be correctly decoded while other layers of the same packet are incorrectly decoded. However, the correct decoding of some layers in a packet facilitates the correct decoding of other layers.

Therefore, once D2 is correctly decoded, the HARQ layers of packet 411 may also be more easily decoded. In the example of FIG. 4, following the proper decoding of D2, the HARQ layers carrying R1 (D1) may also be properly decoded. Once R1 (D1) has been properly decoded, the receiver may attempt to properly decode the data layers of packet 410 carrying D1. If D1 is successfully decoded, an ACK 405c is transmitted. However, if D1 is still not successfully decoded, a NACK is transmitted instead.

As seen from the example of FIG. 4, compared to the example of FIG. 1, the IR bits required to successfully decode D1, D2 and D3 after two unsuccessfully received packets are significantly reduced. In particular, the method illustrated in FIG. 4 takes advantage of the fact that by successfully decoding the data layers of packet 411, the decoding of the HARQ layers is also facilitated. As such, in the third packet 412, only R1 (D2) is provided, and R2(D1) is omitted.

Figure 5:
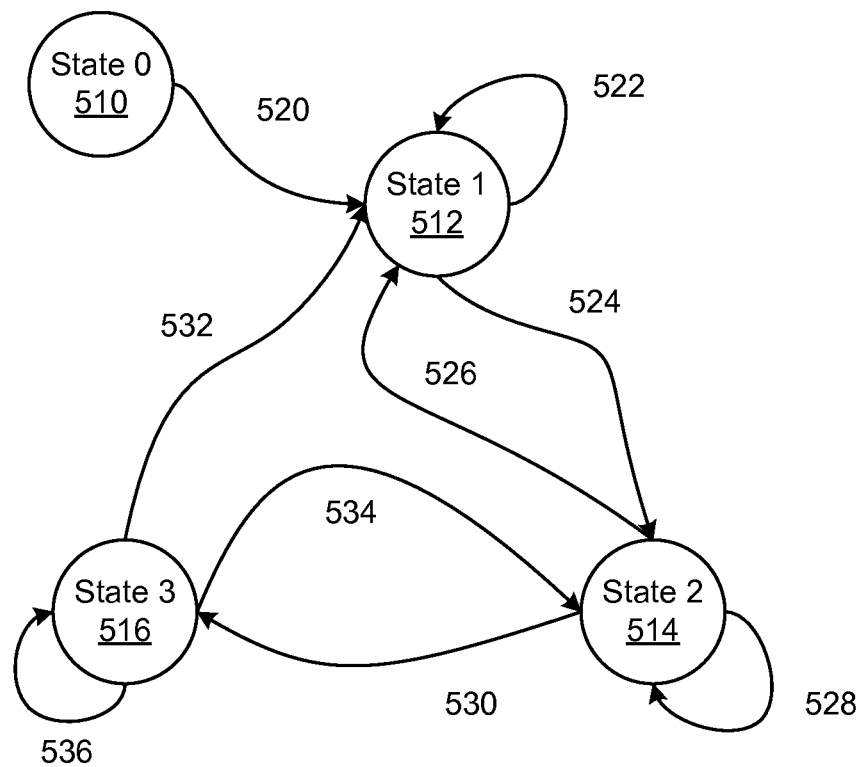
FIG. 5 is a state transition diagram illustrating one example of transitioning between states in accordance with state tables described herein.

According to at least one embodiment of the present disclosure, communications between the transmitter and the receiver are governed by state tables. In this way, each the transmitter and the receiver know the current state of the communication, and knows what to expect from each other. Further, example state transitions are shown with regards to FIG. 5.

State tables are determined prior to the communication, and may be signaled using any means known in the art. The state tables shown herein are for illustrative purposes only and the present disclosure is not so limited.

Each state, from State 0 to State 3, refers to a situation based on the number of HARQ feedbacks expected at the transmitter. Therefore, at State 0, shown with reference 510 in FIG. 5, no HARQ feedback is expected because no packet has been transmitted yet. At State 1, shown with reference 512 in FIG. 5, one HARQ feedback is expected, at State 2, shown with reference 514, two HARQ feedbacks are expected and at State 3, shown with reference 516, three HARQ feedbacks are expected.

Each row of a state table corresponds to the HARQ feedback last received at the transmitter. For each row, a transmission decision is provided. Transmission decisions define which data and HARQ layers are to be transmitted. Thus, for example, if a mobile device sent an ACK for D1 and a NACK for D2, the mobile device will know based on the state table that the next transmission will include data layers carrying D3 and HARQ layers carrying R1 (D2).

Table 1 represents State 0, in which no data packet is transmitted yet. There is no HARQ feedback, and the only data to be transmitted is D1. After transmission of D1 occurs, the communication reaches State 1, as shown by arrow 520.

TABLE 1

| State 0 - No packet transmitted yet | | |
|---|---|---|
| Feedback | Tx decision | State as Tx happens |
| NA | D1 | 1 |

Table 2 below represents State 1, which occurs after transmission of a data packet in State 0. If an ACK is received for D1, the next packet to be transmitted will transmit data D2, and remain in State 1, shown by arrow 522. However, if a NACK is received, the next packet to be transmitted will include HARQ layers carrying R1(D1) (i.e., the first redundancy bits for D1), as well as data layers carrying D2. After the transmission of a packet including D2 and R1(D1), the communication reaches State 2, shown by arrow 524.

TABLE 2

| State 1 - 1 HARQ feedback | | |
|---|---|---|
| Feedback for D1 | Tx decision | State as Tx happens |
| ACK | D2 | 1 |
| NACK | D2 + R1(D1) | 2 |

Table 3 below represents State 2. The state is reached after transmission of a data packet including HARQ layers, one previous packet having been unsuccessfully decoded. If the transmission of a data packet carrying data D2 and R1(D1) is successful, and D1 is successfully decoded with the assistance of R1(D1), two ACKs are received. The next packet transmitted includes only data layers carrying data D3, and the communications returns to State 1, as shown by arrow 526.

If an ACK is received for D1 and a NACK is received for D2, that is if data layers carrying D2 were not successfully decoded but HARQ layers carrying R1(D1) were successfully decoded and D1 was successfully decoded with the assistance of R1(D1), the next packet to be transmitted will include data layers carrying data D3 and HARQ layers carrying redundancy bits for D2, or R1(D2) based on the nomenclature described above. After that transmission, the communication remains in State 2, as shown by arrow 528.

If a NACK is received for D1 and an ACK is received for D2, that is if data layers carrying D2 were successfully decoded but HARQ layers carrying R1 (D1) were not successfully decoded, or if R1 (D1) did not successfully assist in the decoding of D1, the next packet to be transmitted will include data layers carrying data D3 and HARQ layers carrying a second set of redundancy bits for D1, or R2(D1). After that transmission, the communication remains in State 2, as shown by arrow 528.

If two NACKs are received, the next packet to be transmitted may include R1 (D2), or R1 (D2) and R2(D1), or D3+R1 (D2), based on the specific state tables used in the communication.

If the next transmission includes only R1 (D2), or R1 (D2) and R2(D1), the communications remain in State 2. If D3 is also transmitted, the communications reach state 3, as shown by arrow 530.

TABLE 3

2 HARQ feedbacks

| Feedback for D1/D2 | Tx decision | State as Tx happens |
|---|---|---|
| ACK/ACK | D3 | 1 |
| ACK/NACK | D3 + R1(D2) | 2 |
| NACK/ACK | D3 + R2(D1) | 2 |
| NACK/NACK | R1(D2), or | 2 |
|  | R1(D2) + R2(D1), or | 2 |
|  | D3 + R1(D2) | 3 |

Table 4 below represents State 3. As discussed above, in State 3, the transmitter expects three HARQ feedbacks, one for each of D1, D2 and D3. If three ACKs are received, the next packet to be transmitted will have only data layers carrying data D4 and the communications return to State 1, as shown by arrow 532.

If ACKs are received for D1 and D2, but a NACK is received for D3, the next packet to be transmitted will have data layers carrying data D4 and HARQ layers carrying R1 (D3) to assist in the decoding of D3. After transmission of that packet the communications will return to State 2, as shown by arrow 534.

Similarly, if ACKs are received for D1 and D3, and a NACK is received for D2, the next packet to be transmitted will have data layers carrying data D4 and HARQ layers carrying R2(D2) to further assist in the decoding of D2. After transmission of that packet, the communications will return to State 2, as shown by arrow 534.

Also similarly, if ACKS are received for D2 and D3, and a NACK is received for D1, the next packet to be transmitted will have data layers carrying data D4 and HARQ layers carrying R3(D1) to further assist in the decoding of D1. After transmission of that packet, the communications will return to State 2, as shown by arrow 534.

If an ACK is received for D1 and NACKs are received for D2 and D3, the next packet will have data layers carrying data D4 and HARQ layers carrying R1 (D3). As per the above, the proper decoding of D3, with the assistance of R1 (D3), may also assist in the decoding of HARQ layers accompanying D3 and hence also assist in the decoding of D2. After transmission of that packet, the communications will remain in State 3, as shown by arrow 536.

If an ACK is received for D2 and NACKs are received for D1 and D3, the next packet to be transmitted will have data layers carrying data D4 and HARQ layers carrying R1 (D3). As per the above, the proper decoding of D3, with the assistance of R1 (D3), may also assist in the decoding of HARQ layers accompanying D3 and hence also assist in the decoding of D1. After transmission of that packet, the communications will remain in State 3, as shown by arrow 536.

If an ACK is received for D3 and NACKs are received for D1 and D2, the next packet to be transmitted will have data layers carrying data D4 and HARQ layers carrying R3(D1). After transmission of that packet, the communications will remain in State 3, as shown by arrow 536.

If three NACKS are received, the next packet may include only HARQ layers carrying R1 (D3), R1 (D3) and R3(D1), R1 (D3) and R2(D2), or R1 (D3), R3(D1) and R2(D2), based on the specific state tables used. Notably, in the present embodiment, no D4 data is transmitted in the case of three NACKs being received, however the present disclosure is not so limited and any number of data transfers are theoretically possible.

TABLE 4

3 HARQ feedbacks

| Feedback for D1/D2/D3 | Tx decision | State as Tx happens |
|---|---|---|
| ACK/ACK/ACK | D4 | 1 |
| ACK/ACK/NACK | D4 + R1(D3) | 2 |
| ACK/NACK/ACK | D4 + R2(D2) | 2 |
| ACK/NACK/NACK | D4 + R1(D3) | 3 |
| NACK/ACK/ACK | D4 + R3(D1) | 2 |
| NACK/ACK/NACK | D4 + R1(D3) | 3 |
| NACK/NACK/ACK | D4 + R3(D1) | 3 |
| NACK/NACK/NACK | R1(D3), or | 3 |
|  | R1(D3) + R3(D1), or |  |
|  | R1(D3) + R2(D2), or |  |
|  | R1(D3) + R3(D1) + R2(D2) |  |

As illustrated by the above example, HARQ feedback may be provided for up to N packets. In the above example, N is equal to 3, however the present disclosure is not limited to this embodiment and any value of N is contemplated.

Generally, according to at least some embodiments, HARQ feedback is provided for up to N packets. The joint interpretation of HARQ feedback is performed based on a state machine. The state machine defines the possible states the communication may be in, and each state corresponds to a number of HARQ feedbacks expected at the transmitter. As shown above, this allows both the transmitter and the receiver to agree on which HARQ feedback corresponds to which received data, and on which data and HARQ retransmission data should be sent on the next transmission.

Control signaling required for the proper operation of the above method further includes the number of HARQ layers and the number of data layers in each transmission, the mapping of FEC codes to layers, and the codebook size of the layers. In some embodiments, some or all of such configuration could be performed for each transmission. This configuration could also be fixed and predefined, or broadcast by the network through higher-level signaling.

In some embodiments, the network may also configure communications so that HARQ feedback is provided for each FEC code or layer, or that a HARQ feedback is provided for a set of FEC codes or layers.

In at least some embodiments, the encoding of the HARQ feedback may also be adapted to provide additional protection to high probability combinations. In particular, if three HARQ feedbacks are expected, it is more likely that ACK/ACK/ACK will be transmitted than NACK/NACK/NACK.

Thus, in some embodiments, ACK/ACK/ACK may be provided with additional protection compared to NACK/NACK/NACK. This reduces the overhead required for HARQ feedback and reduces the odds of ACK/NACK misinterpretations for high probability combinations.

As seen above, the present disclosure provides for the transmission of data packets comprising data layers and HARQ layers. In some embodiments, if HARQ layers are expected at the receiver, for example if at least one previously received data layer was incorrectly decoded and a NACK was indicated, the number of HARQ layers may be predetermined by higher level signaling or other means. In at least some embodiments, the number of HARQ layers is determined dynamically.

Figure 6:
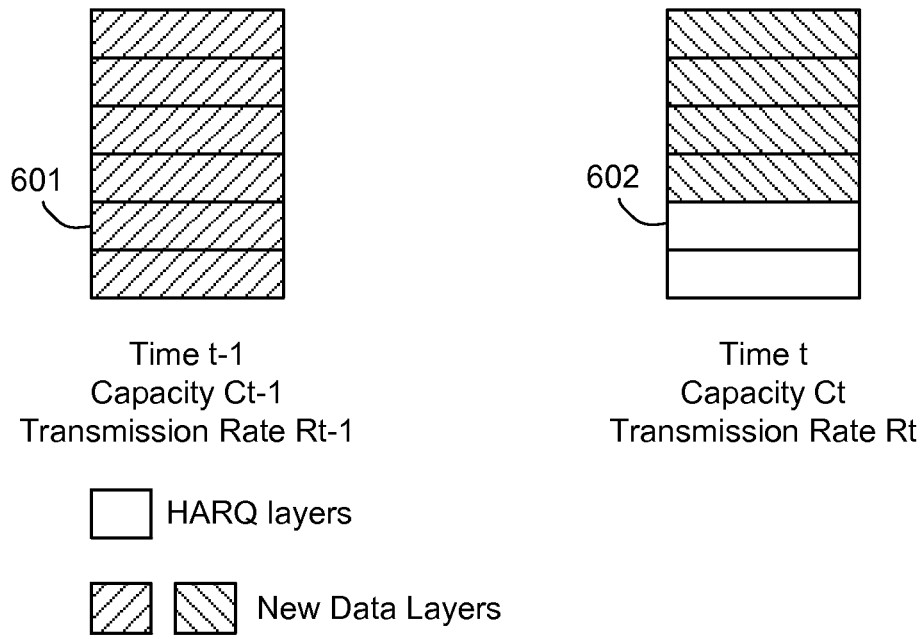
FIG. 6 is a block diagram illustrating data packets according to at least one embodiment of the present disclosure.

Reference is now made to FIG. 6. In the embodiment of FIG. 6, the transmission rate at time t is denoted as $R_t$, and the capacity of the channel is denoted as $C_t(P)$, where P is the signal-to-noise ratio.

Thus, a first packet 601 transmitted at time t−1 benefits from a capacity of $C_{t-1}$ and a transmission rate of $R_{t-1}$. A second packet 602 transmitted at time t benefits from a capacity of $C_t$ and a transmission rate of $R_t$. The second packet 602 comprises two HARQ layers.

The relationship between transmission rates, channel capacity, and the ratio of power allocated to HARQ layers is provided by the following equations.

$$R_{t-1} < C_{t-1}(P) + C_t(\alpha_{HARQ} P) \quad (1)$$

$$R_t < C_t((1-\alpha_{HARQ})P) \quad (2)$$

$$R_{t-1} + R_t < C_{t-1}(P) + C_t(P) \quad (3)$$

In equations 1-3 above, $\alpha_{HARQ}$ denotes the ratio of power allocated to HARQ layers. If the power of all SCMA layers is the same, $\alpha_{HARQ}$ is equal to $N_{HARQ}$ divided by J, where $N_{HARQ}$ denotes the number of HARQ layers and J denotes the total number of layers. For example, if there are six total layers (J=6), and the power ratio allocated to HARQ layers is 0.33, the number of HARQ layers is two ($N_{HARQ} = \alpha_{HARQ} * J = 0.33 * 6 = 2$).

The number of HARQ layers in a transmission may be determined using different approaches. According to at least one embodiment, an aggressive approach is used based on equation 1.

With reference to FIG. 6, the receiver calculates the number of IR bits based on $R_{t-1}$ and $C_{t-1}(P)$. The receiver then estimates $C_t(P)$ using a channel model. $\alpha_{HARQ}$ is then calculated using equation 1. From $\alpha_{HARQ}$, the number of HARQ layers is determined.

According to at least a further embodiment, $\alpha_{HARQ}$ is computed using equation (4) below:

$$\alpha_{HARQ} = (R_{t-1} - C_{t-1}(P))/C_t(P) \quad (4)$$

From $\alpha_{HARQ}$ in equation 4 above, the number of HARQ layers is determined.

Figure 7:
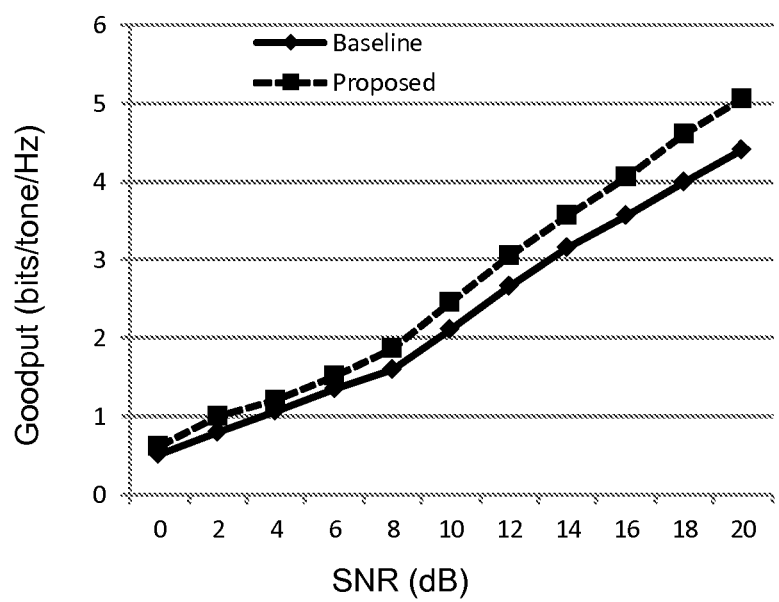
FIG. 7 is a graph comparing performance of method according to at least one embodiment of the present disclosure versus a baseline.

Reference is now made to FIG. 7, which shows the results of a simulation using the techniques disclosed herein. The simulation was setup based on Shannon capacity. In particular, the transmission rate was set such that the outage probability is around the target Block Error Rate (BLER) value. The antenna configuration was Single-Input Single-Output (SISO), and the total number of SCMA layers was 6. The number of HARQ layers was determined based on the capacity formula using equation (4). The target BLER was 20%.

According to the baseline scheme, only HARQ bits were transmitted whenever an outage occurred. Only one retransmission was assumed. Specifically, if after one retransmission there was still outage, the packet was not included in the goodput calculation. The target BLER was 10%.

Figure 8A:
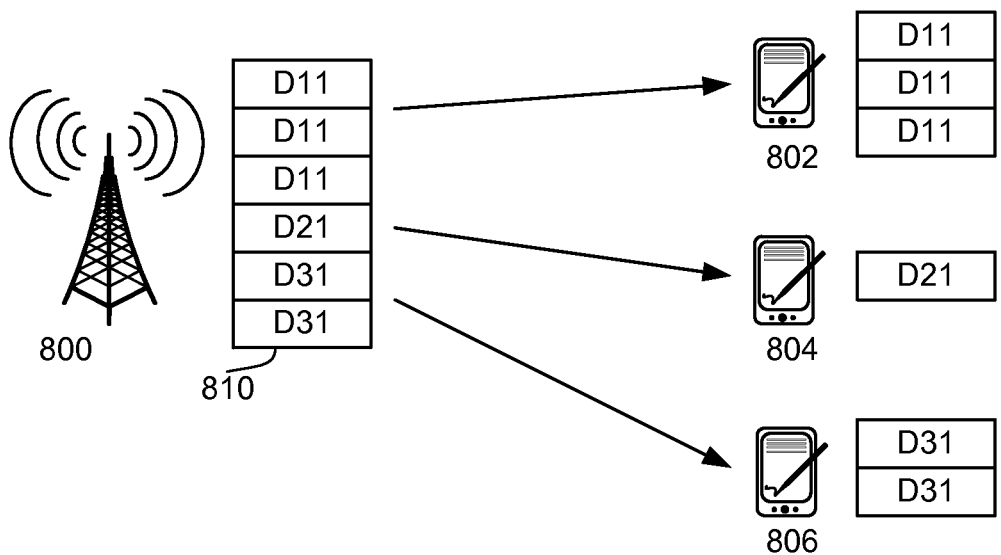
FIG. 8A is a graphic representation of a first downlink multi-user SCMA transmission according to at least one embodiment of the present disclosure.

Reference is now made to FIG. 8A which illustrates a transmission of data in Multi-User SCMA (MU-SCMA). In MU-SCMA, multiple packets of multiple wireless devices are transmitted over multiple SCMA layers. While the example of FIG. 8A illustrates MU-SCMA on the downlink, the principles described herein may be applied more generally.

The MP-HARQ techniques discussed above may also be adapted for MU-SCMA, as shown below.

As seen in FIG. 8A, a data packet 810 is transmitted by a network element 800 to wireless devices 802, 804 and 806. The data packet 810 includes three data layers containing data D11 for wireless device 802, 1 data layer containing data D21 for wireless device 804, and 2 data layers containing data D31 for wireless device 806. Notably, while the present example includes a packet with six layers, other number of layers are possible and the present disclosure is not limited to any number of layers.

In the example of FIG. 8A, each of wireless devices 802, 804 and 806 fail to properly decode the data addressed to them and return a NACK (not shown) to network element 800.

Figure 8B:
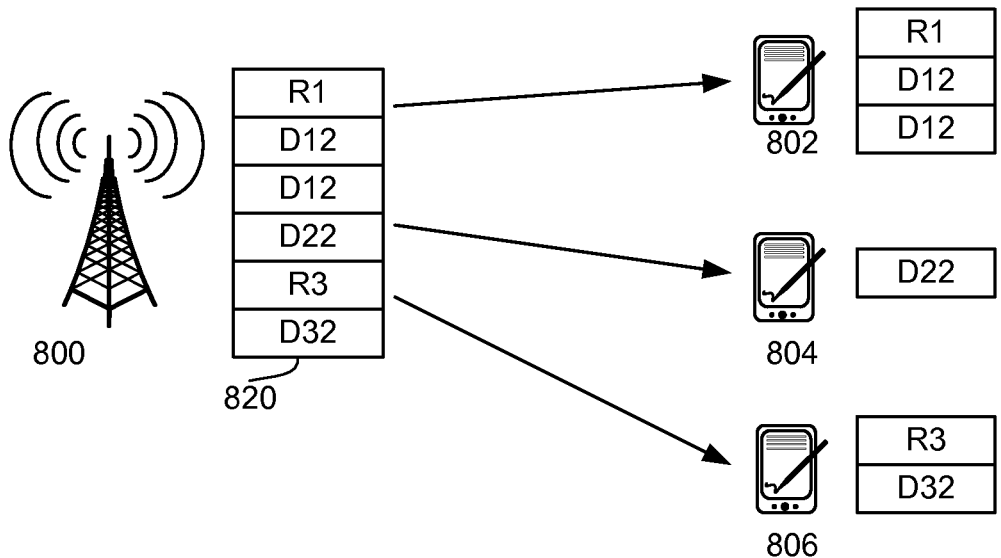
FIG. 8B is a graphic representation of a downlink multi-user SCMA HARQ transmission according to at least one embodiment of the present disclosure.

Reference is now made to FIG. 8B, which illustrates a transmission of a packet including HARQ layers for multiple users. Specifically, FIG. 8B illustrates a possible packet sent following the scenario described with respect to FIG. 8A above, according to at least one embodiment of the present disclosure.

As seen in FIG. 8B, network element 800 transmits packet 820 to wireless devices 802, 804 and 806. Because at least one NACK was received for previously transmitted data layers, HARQ layers are included in packet 820. Specifically, packet 820 includes a HARQ layer containing redundancy bits R1, data layers containing data D12, data layers containing data D22, a HARQ layer containing redundancy bits R3, and a data layer containing data D32.

In the present disclosure, the following nomenclature will be adhered to. Data Dyz is the z-th data addressed to the y-th wireless device. Therefore, D32 is the second set of data for the third wireless device, namely wireless device 806. Moreover, redundancy bits Rw are redundancy bits addressed to the w-th wireless device.

Therefore, according to FIG. 8B, packet 820 includes redundancy bits R1 for wireless device 802 and redundancy bits R3 for wireless device 806. Notably, no redundancy bits for wireless device 804 are included, even though wireless device 804 also transmitted a NACK after reception of packet 810 illustrated in FIG. 8A.

The omission of redundancy bits intended for wireless device 804 is possible because the present disclosure takes advantage of code domain multiplexing, or in the specific example, SCMA. Thus, redundancy bits R1 and R3 are received by each of wireless devices 802, 804 and 806. Wireless device 802 receives R1 and uses R1 to decode previously received D11. Similarly, wireless device 806 receives R3 and uses R3 to decode previously received D31. Meanwhile, wireless device 804 receives R1 and R3, and may use R1 and R3 to correctly decode D11 and D31. Because of the properties of code domain multiplexing, and the joint MPA detection described above, the decoding of D11 and D31 assists in the decoding of D21. Therefore, packet 820 may also assist wireless 804 in properly decoding D21 despite not including redundancy bits directly intended for that purpose.

The above techniques helps prevent unnecessary HARQ transmissions in the context of MU-SCMA or other schemes of multi-user transmissions in which code domain multiplexing is used.

More generally, when a packet is transmitted to N wireless devices comprising data layers for each the N wireless devices, and at least one NACK is returned from the N wireless devices, the next data packet transmitted to the N wireless devices may include HARQ layers for a subset of the incorrectly decoded data layers.

In order to support MP-HARQ for MU-SCMA as described above, the following HARQ feedback protocol is proposed. While the following example illustrates downlink communications, the following principles may be applied more generally.

Assuming a scenario where N wireless devices are addressed using MU-SCMA, their scheduled rates are D1, D2, . . . DN, satisfying the condition that D1<=D2<= . . . <=DN. Typically, a transmission with a lower rate is easier to decode than a transmission with a higher rate.

According to the proposed protocol, wireless device n reports a 1-bit NACK if all Di where i<n are decoded correctly but Dn is not decoded correctly.

Further according to the proposed protocol, wireless device n reports a 1-bit ACK if it successfully decoded its packet.

Wireless device n may also report a 1-bit ACK if Dn was not successfully decoded but one or more wireless devices for which i<n are not successfully decoded and wireless device n estimates that with proper decoding of every Di for i<n, the decoding of Dn would be feasible. In the latter case, wireless device n will expect HARQ layers that will assist it in the decoding of some Di for kn. Once wireless device n receives these HARQ layers, wireless device n will decode some Di for i<n, and based on its own estimation, the wireless device then ought to be able to successfully decode Dn. For greater clarity, such a 1-bit ACK is differentiated from a regular ACK and is termed a "Conditional ACK" or CACK.

According to the proposed protocol, a further HARQ signaling is introduced. Specifically, an Override Signal (ORS) is proposed for the scenario in which wireless device n sent a CACK but was ultimately unsuccessful in decoding Dn. As per the above, this may occur when wireless device n did not receive HARQ layers for Di for i<n, or when despite having received HARQ layers for Di for i<n, wireless device n still failed to successfully decode Dn (in other words the wireless device's estimation was incorrect).

The ORS may be transmitted in the form of ON/OFF signaling or regular 0/1 bit transmission.

Table 5 below summarizes the signaling of the above protocol.

TABLE 5

Summary of Feedback Protocol

| Feedback Type | Feedback Signal |
|---|---|
| ACK | 1 |
| NACK | 0 |
| CACK | 1 |
| ORS | 0 |

Figure 9:
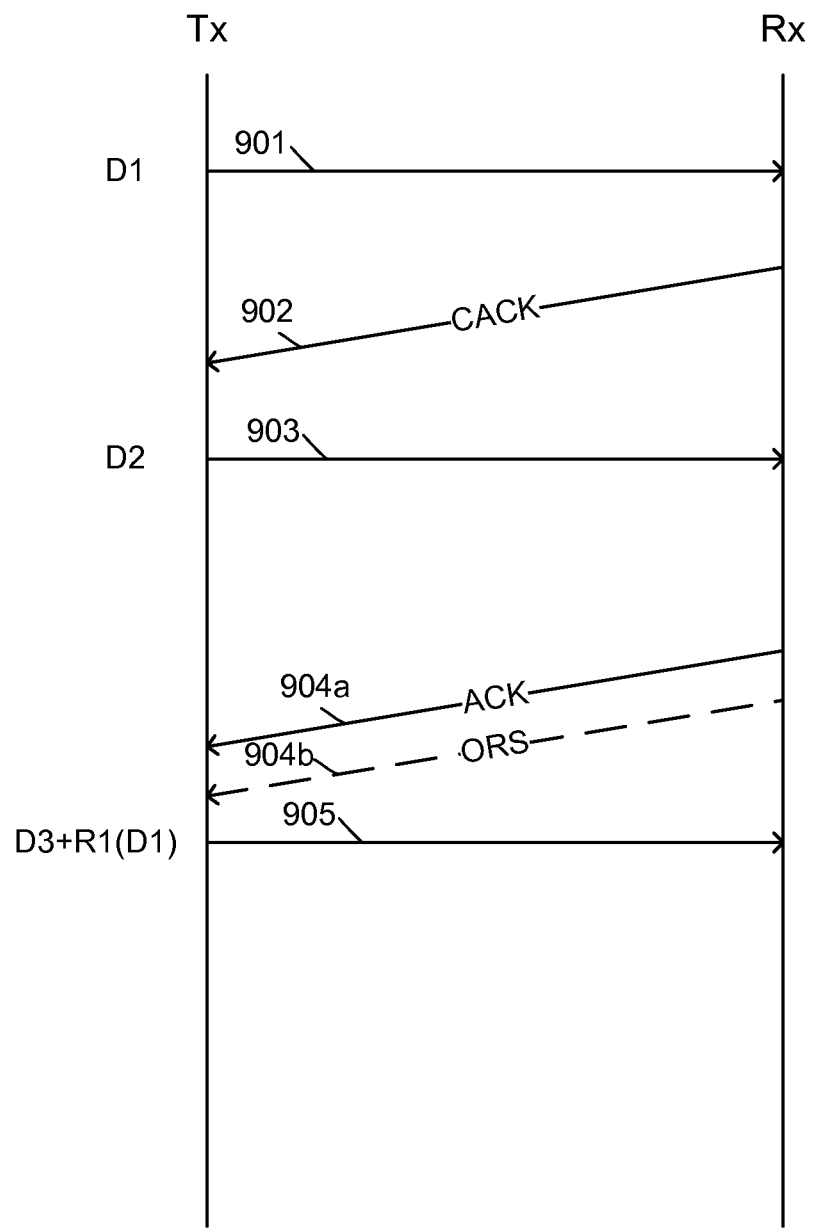
FIG. 9 is a block diagram illustrating interpretation of HARQ feedback for MP-HARQ MU-SCMA according to at least one embodiment of the present disclosure.

Reference is now made to FIG. 9.

As seen in FIG. 9, a first packet D1 is transmitted as illustrated by arrow 901. In response, the receiver transmits a CACK as illustrated by arrow 902. Notably, from the point of view of the transmitter, the CACK is indistinguishable from an ACK. Only the receiver is aware that a CACK was transmitted and not an ACK. As discussed above, the CACK is transmitted because D1 was not successfully decoded, but D1 expected the next packet to include HARQ layers directed at other data than D1, and that D1 could be successfully decoded if the other data was successfully decoded.

Upon reception of the CACK, the transmitter assumes that an ACK was received and transmits D2 as illustrated by arrow 903.

D2 is correctly received and an ACK is transmitted as illustrated by arrow 904*a*. If the receiver was correct with respect to the CACK, D2 includes HARQ layers directed to data other than D1. The receiver uses these HARQ layers to decode the data other than D1, which in turn allows the receiver to correctly decode D1. However, in the case of FIG. 9, the receiver was incorrect, as may be the case if no HARQ layers were included in D2 or if even with the HARQ layers of D2 the receiver was unable to decode D1, and an ORS is transmitted as illustrated by arrow 904*b*.

If the transmitter receives an ORS, it now knows that the previously received ACK was in fact a CACK and redundancy bits for D1 should be included in the next transmission. Thus, D3 and R1 (D1) are transmitted as illustrated by arrow 905.

More generally, an ACK is transmitted when data is correctly decoded, and a CACK is transmitted when data is incorrectly decoded but could be correctly decoded if expected HARQ layers are transmitted in a subsequent packet. If the data remains incorrectly decoded after a CACK is transmitted, an ORS is transmitted.

A NACK is transmitted when data is incorrectly decoded and no HARQ layers for other user's data which may assist in the decoding are expected in a subsequent transmission.

HARQ layers may be expected on the basis of whether layers with smaller transmission rate (i<n) are successfully decoded.

From the point of view of the transmitter, when an ACK or CACK is received for a given wireless device, new data addressed to this wireless device is transmitted in a subsequent MU-SCMA packet. If however a NACK is received, the next packet may include HARQ layers for this wireless device. Further, when an ORS is received in addition to the HARQ feedback for the next packet, the next packet after that includes HARQ layer for the original packet.

Figure 10:
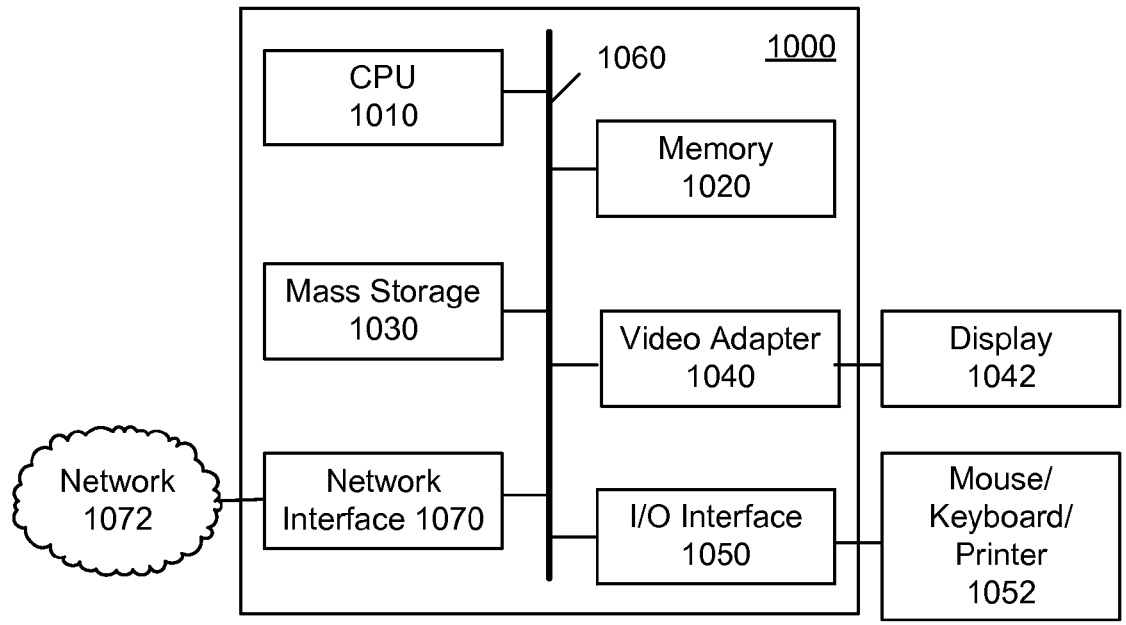
FIG. 10 is a block diagram illustrating a computing platform.

The above functionality may be implemented on any one or combination of network elements. FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit equipped with one or more input/output devices, such as a speaker, microphone, mouse, touchscreen, keypad, keyboard, printer, display, and the like. The processing unit 1000 may include a central processing unit (CPU) 1010, memory 1020, a mass storage device 1030, a video adapter 1040, and an I/O interface 1050 connected to a bus 1060.

The bus 1060 may be one or more of any type of several bus architectures including a memory bus or memory controller, a peripheral bus, video bus, or the like. The CPU 1010 may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs.

The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1050 provide interfaces to couple external input and output devices to the processing unit. As illustrated, examples of input and output devices include the display 1042 coupled to the video adapter 1040 and the mouse/keyboard/printer 1052 coupled to the I/O interface 1050. Other devices may be coupled to the processing unit 1000, and additional or fewer interface cards may be utilized. For example, a serial interface such as Universal Serial Bus (USB) (not shown) may be used to provide an interface for a printer.

The processing unit 1000 also includes one or more network interfaces 1070, which may comprise wired links, such as an Ethernet cable or the like, and/or wireless links to access nodes or different networks. The network interface allows the processing unit to communicate with remote units via the networks. For example, the network interface 1070 may provide wireless communication via one or more transmitters/transmit antennas and one or more receivers/receive antennas. In an embodiment, the processing unit is coupled to a local-area network or a wide-area network, shown as network 1072, for data processing and communications with remote devices, such as other processing units, the Internet, remote storage facilities, or the like.

Figure 11:
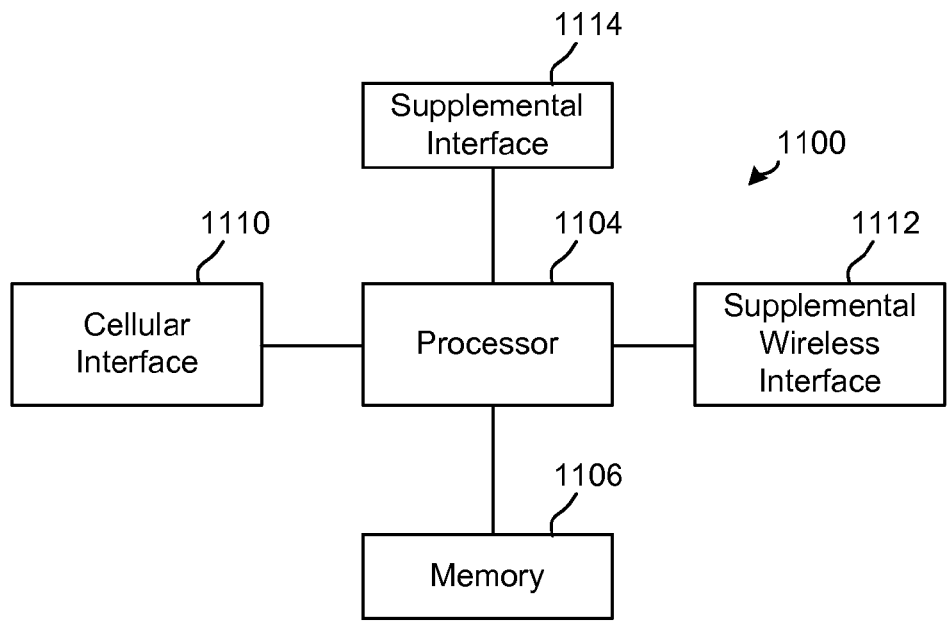
FIG. 11 illustrates a block diagram of an embodiment communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, a cellular interface 1110, a supplemental wireless interface 1112, and a supplemental interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The cellular interface 1110 may be any component or collection of components that allows the communications device 1100 to communicate using a cellular signal, and may be used to receive and/or transmit information over a cellular connection of a cellular network. The supplemental wireless interface 1112 may be any component or collection of components that allows the communications device 1100 to communicate via a non-cellular wireless protocol, such as a Wi-Fi or Bluetooth protocol, or a control protocol. The device 1100 may use the cellular interface 1110 and/or the supplemental wireless interface 1112 to communicate with any wirelessly enabled component, e.g., a base station, relay, mobile device, etc. The supplemental interface 1114 may be any component or collection of components that allows the communications device 1100 to communicate via a supplemental protocol, including wire-line protocols. In embodiments, the supplemental interface 1114 may allow the device 1100 to communicate with another component, such as a backhaul network component.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the present invention further discloses the following embodiments. In accordance with one example, a transmitter includes a hardware processor; and a non-transitory memory storing codes to implement instructions. The instructions instruct the processor, in various embodiments may be in association with other hardware of the transmitter, to receive a NACK from a receiver. The NACK corresponds to a previously transmitted data packet. The instruction also instructs to transmit a new packet to the receiver. In an example, the new packet includes at least one data layer carrying new data, and at least one retransmission layers carrying retransmission data related to the previously transmitted data packet. The at least one data layers and the at least one retransmission layers are multiplexed in the code domain.

In another example, a receiver includes a hardware processor; and a non-transitory memory storing codes to implement instructions. The instructions instruct the processor, in various embodiments may in association with other hardware of the receiver, to determine that a data packet received from a transmitter was incorrectly decoded. The processor, may in association with other hardware of the receiver, transmits a NACK to the transmitter and receives from the transmitter, a new packet. The new packet includes at least one data layers carrying new data, and at least one retransmission layers carrying retransmission data corresponding to the data packet. The at least one data layers and the at least one retransmission layers are multiplexed in the code domain.

In another example, a receiver for decoding incoming packets includes a hardware processor and a non-transitory memory storing codes to implement instructions. The instructions instruct the processor, in various embodiments may in association with other hardware of the receiver, to receive a first packet and a second packet from a transmitter. The first packet includes first data layers. The second packet includes second data layers and Hybrid Automated Repeat reQuest (HARQ) layers. The processor, may in association with other hardware of the receiver, combines a Log Likelihood Ratio (LLR) for the first data layers with an LLR for the HARQ layers, determines a probability of symbols for the first data layers, the second data layers, and the HARQ layers; and attempts to decode the second data layers. If decoding of the second data layer is ambiguous, the processor reattempts to decode the second data layers using the probability of symbols for the HARQ layers and the first data layers.

In another example, a network element includes a hardware processor and a non-transitory memory storing codes to implement instructions. The processor is configured to receive HARQ feedback from a plurality of wireless device, and transmit, to the plurality of wireless devices a packet including HARQ layers. The HARQ feedback includes at least one Negative Acknowledgment (NACK). The at least one NACK corresponding to at least one incorrectly decoded data layer at one of the plurality of wireless devices. The HARQ layers including Incremental Redundancy (IR) bits for a subset of the at least one incorrectly decoded data layers.

In another example, a wireless device includes a hardware processor and a non-transitory memory storing codes to implement instructions. The processor is configured to, may in association with other hardware of the wireless device, implement a method includes steps of receiving a data packet, the data packet including data layers addressed to the wireless device and data layers addressed to other wireless devices; attempting to decode the data layers addressed to the wireless device; determining that the decoding of the data layers addressed to the wireless device failed; receiving a second packet including HARQ layers, the HARQ layers including Incremental Redundancy (IR) bits for data layers addressed to the other wireless devices; using the HARQ layers to decode the data layers addressed to the other wireless devices; and re-attempting to decode the data layers addressed to the wireless device.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method at a transmitter, comprising:
receiving a Negative Acknowledgement (NACK) from a receiver, the NACK corresponding to a previously transmitted data packet; and
transmitting, to the receiver, a new packet,
wherein the new packet comprises at least one data layer carrying new data, and at least one retransmission layer carrying retransmission data related to the previously transmitted data packet, the at least one data layer and the at least one retransmission layer being multiplexed in a code domain, wherein being multiplexed in a code domain comprises encoding the at least one data layer using a first codebook and encoding the at least one retransmission layer using a second codebook.

2. The method of claim 1, wherein the at least one data layer and the at least one retransmission layer are encoded using Sparse Code Multiple Access (SCMA) in the multiplexing.

3. The method of claim 1, further comprising:
receiving an additional NACK from the receiver, the additional NACK corresponding to an additional previously transmitted data packet, wherein the at least one retransmission layer further carries retransmission data corresponding to the additional previously transmitted data packet.

4. The method of claim 1, further comprising:
receiving Hybrid Automated Repeat reQuest (HARQ) feedback from the receiver, the HARQ feedback corresponding to the new data;
receiving second HARQ feedback from the receiver, the second HARQ feedback corresponding to the previously transmitted data packet; and
when the HARQ feedback and the second HARQ feedback are an Acknowledgment (ACK), transmitting, to the receiver, a second new packet, the second new packet including only second data layers carrying second new data.

5. The method of claim 1, further comprising
receiving multi-packet Hybrid Automated Repeat reQuest (HARQ) feedback from the receiver, wherein the multi-packet HARQ feedback includes feedbacks corresponding to the at least one data layer and the at least one retransmission layer; and
determining whether the at least one data layer and the at least one retransmission layer are correctly decoded from the multi-packet HARQ feedback.

6. The method of claim 5, wherein the determining uses a state table known to the transmitter and the receiver.

7. The method of claim 6, wherein the state table are broadcast by a network element.

8. A method, at a receiver, comprising:
determining that a first data packet received from a transmitter was incorrectly decoded;
transmitting a Negative Acknowledgment (NACK) to the transmitter; and
receiving, from the transmitter, a new packet,
wherein the new packet comprises at least one data layer carrying new data, and at least one retransmission layer carrying retransmission data corresponding to the first data packet, the at least one data layer and the at least one retransmission layer being multiplexed in a code domain, wherein being multiplexed in a code domain comprises encoding the at least one data layer using a first codebook and encoding the at least one retransmission layer using a second codebook.

9. The method of claim 8, wherein the at least one data layer and the at least one retransmission layer are encoded using Sparse Code Multiple Access (SCMA) in the multiplexing.

10. The method of claim 8, wherein the at least one retransmission layer further carries retransmission data corresponding to a second data packet transmitted previously to the first data packet.

11. The method of claim 8, further comprising transmitting Hybrid Automated Repeat reQuest (HARQ) feedback to the transmitter, the HARQ feedback corresponding to the new data.

12. The method of claim 8, further comprising:
decoding the first data packet using the retransmission data; and
transmitting Hybrid Automated Repeat reQuest (HARQ) feedback to the transmitter, the HARQ feedback indicating whether the decoding was successful.

13. The method of claim 8, further comprising
transmitting, multi-packet Hybrid Automated Repeat reQuest (HARQ) feedback from the receiver, wherein the multi-packet HARQ feedback includes feedbacks corresponding to the at least one data layer and the at least one retransmission layer.

14. The method of claim 13, further comprising transmitting a state table to the transmitter, wherein the state table indicates whether the at least one data layer and at least one retransmission layer is correctly decoded in associating with the multi-packet HARQ feedback.

15. A method at a receiver for decoding incoming packets comprising:
receiving a first packet from a transmitter, the first packet including first data layers;
receiving a second packet from the transmitter, the second packet including second data layers and Hybrid Automated Repeat reQuest (HARQ) layers, wherein the HARQ layers contain bits to decode at least one previously transmitted and incorrectly decoded data layer, wherein the second data layers and the HARQ layers are multiplexed in a code domain, and wherein being multiplexed in a code domain comprises encoding at least one second data layer using a first codebook and encoding at least one HARQ layer using a second codebook;
combining a Log Likelihood Ratio (LLR) for the first data layers with an LLR for the HARQ layers;
determining a probability of symbols for the first data layers, the second data layers, and the HARQ layers;
attempting to decode the second data layers; and
if decoding of the second data layers is ambiguous, reattempting to decode the second data layers using the probability of symbols for the HARQ layers and the first data layers.

16. The method of claim 15, further comprising attempting to decode the first data layers.

17. The method of claim 15, wherein the probability of symbols for the first data layers, the probability of symbols for the second data layers, and the probability of symbols for the HARQ layers are iteratively updated.

18. A method at a network element, comprising:
receiving HARQ feedback from a plurality of wireless devices, the HARQ feedback comprising a plurality of Negative Acknowledgments (NACKs), the plurality of NACKs corresponding to a plurality of incorrectly decoded data layers at the plurality of wireless devices; and
transmitting, to the plurality of wireless devices, a same packet including HARQ layers, wherein a number of HARQ layers is less than a number of incorrectly decoded data layers.

19. The method of claim 18, wherein the HARQ feedback comprises at least one Acknowledgment (ACK) or Conditional Acknowledgment (CACK) from a selected wireless device from the plurality of wireless devices.

20. The method of claim 19, further comprising, after the transmitting:
receiving an Override Signal (ORS) from the selected wireless device; and
transmitting, to the plurality of wireless devices, a second packet including second HARQ layers, the second HARQ layers including IR bits for data layers that were previously transmitted and addressed to the selected wireless device.

21. A method at a wireless device, comprising:
receiving a data packet, the data packet including data layers addressed to the wireless device and data layers addressed to other wireless devices;
attempting to decode the data layers addressed to the wireless device;
determining that the decoding of the data layers addressed to the wireless device failed;
receiving a second packet including HARQ layers, the HARQ layers including Incremental Redundancy (IR) bits for data layers addressed to the other wireless devices;
using the HARQ layers to decode the data layers addressed to the other wireless devices; and
re-attempting to decode the data layers addressed to the wireless device using the decoded data layers addressed to the other wireless devices.

22. The method of claim 21, further comprising transmitting a NACK after the determining.

23. The method of claim 21, wherein the attempting to decode the data layers addressed to the wireless device comprises attempting to decode the data layers addressed to the other wireless devices.

24. The method of claim 23 further comprising determining whether the attempt to decode the data layers addressed to the other wireless devices was successful.

25. The method of claim 24, wherein the data layers addressed to the other wireless devices have a data rate which is less than or equal to the data rate of the data layers addressed to the wireless device.

26. The method of claim 25, further comprising, if the attempt to decode the data layers addressed to the other wireless devices was not successful for at least one of the other wireless devices, transmitting a Conditional Acknowledgment (CACK).

27. The method of claim 26, further comprising if the re-attempting is not successful, transmitting an Override Signal (ORS).

* * * * *